United States Patent
Chen

(10) Patent No.: US 7,345,809 B2
(45) Date of Patent: Mar. 18, 2008

(54) MIRROR DEVICE WITH ANTI-REFLECTIVE COATING LAYER AND METHOD FOR MANUFACTURING THE SAME

(75) Inventor: Wei-Hsiao Chen, Hsinhua (TW)

(73) Assignee: Himax Technologies, Inc., Hsinhua, Tainan County (TW)

( * ) Notice: Subject to any disclaimer, the term of this patent is extended or adjusted under 35 U.S.C. 154(b) by 0 days.

(21) Appl. No.: 11/331,972

(22) Filed: Jan. 13, 2006

(65) Prior Publication Data
US 2006/0154552 A1 Jul. 13, 2006

(30) Foreign Application Priority Data
Jan. 13, 2005 (TW) .............................. 94101012 A

(51) Int. Cl.
*G02B 26/00* (2006.01)
(52) U.S. Cl. .................. 359/291; 359/292; 359/294
(58) Field of Classification Search .................. 445/24; 359/291; 349/114, 137, 138, 113
See application file for complete search history.

(56) References Cited
U.S. PATENT DOCUMENTS
4,952,026 A * 8/1990 Bellman et al. ............ 359/619
6,437,903 B1 * 8/2002 Kozhukh .................... 359/291
6,828,595 B2 * 12/2004 Leng ........................... 257/98

* cited by examiner

Primary Examiner—Ricky Mack
Assistant Examiner—James R Greece
(74) Attorney, Agent, or Firm—Ladas & Parry LLP

(57) ABSTRACT

The invention relates to a method for manufacturing a mirror device with anti-reflective coating layer. The method of the invention comprises: (a) forming an anti-reflective metal film on a first surface of a mirror material to be a mirror device; (b) defining a plurality of mirror units from the mirror device, each mirror unit having a mirror layer and an anti-reflective metal film unit, the anti-reflective metal film unit formed on a first surface of the mirror layer; and (c) defining an anti-reflective coating layer from the anti-reflective metal film unit, the anti-reflective coating layer formed on edges of the first surface of the mirror layer. According to the invention, the anti-reflective coating layer on the mirror layer can shield a bright area caused by fringe effect so as to minimize the bad influence of the fringe effect. In manufacture, the method of the invention follows the semiconductor manufacturing process, and has high precision and simple process.

21 Claims, 7 Drawing Sheets

MIRROR DEVICE WITH ANTI-REFLECTIVE COATING LAYER AND METHOD FOR MANUFACTURING THE SAME

BACKGROUND OF THE INVENTION

1. Field of the Invention

The present invention relates to a display, and particularly to a mirror device with anti-reflective coating layer and method for manufacturing the same.

2. Description of the Related Art

Since the conventional liquid crystal display (LCD) has a fringe effect on the black and white boundary area, a bright band will be caused in the area that originally should be fully black, resulting in a poor black pixel state, and thereby a poor relative contrast. In the conventional TFT LCD technology, the bright band area can be shielded by adding a black matrix, so as to improve the disadvantages caused by the fringe effect.

Referring to FIG. 5, a structural schematic view of the conventional liquid crystal on silicon (LCoS) is shown. The conventional liquid crystal on silicon 50 mainly comprises: a substrate 51, a storage capacitor 52, a pixel switch 53, a first metal layer (Metal 1) 54, a second metal layer (Metal 2) 55, a mirror device (Mirror Metal) 56, an indium tin oxide layer (ITO) 57 and a liquid crystal material 58. The liquid crystal material is filled between the mirror device 56 and the indium tin oxide layer 57. In the liquid crystal on silicon (LCoS), since the size of pixel is too small (approximately 10 μm) to add a suitable black matrix to shield the bright band area, the problems caused by the fringe effect can't be solved.

Therefore, there is a need to provide a creative and progressive mirror device to solve the problems described above

SUMMARY OF THE INVENTION

An objective of the invention is to provide a method for manufacturing a mirror device with anti-reflective coating layer. The method of the invention comprises the steps of: (a) forming an anti-reflective metal film on a first surface of a mirror material to be a mirror device; (b) defining a plurality of mirror units from the mirror device, each mirror unit having a mirror layer and an anti-reflective metal film unit, the anti-reflective metal film unit formed on a first surface of the mirror layer; and (c) defining an anti-reflective coating layer from the anti-reflective metal film unit, the anti-reflective coating layer formed on edges of the first surface of the mirror layer.

Another objective of the invention is to provide a method for manufacturing a mirror device with anti-reflective coating layer. The method of the invention comprises the steps of: (a) defining a plurality of mirror layers from a mirror material, a gap disposed between the adjacent mirror layers; (b) filling a light absorption material into the gaps; (c) forming an isolation layer on a first surface of the mirror layers; (d) forming an anti-reflective metal film on a first surface of the isolation layer; and (e) defining an isolation coating layer and an anti-reflective coating layer from the isolation layer and the anti-reflective metal film respectively, the isolation coating layer and the anti-reflective coating layer formed on edges of the first surface of the mirror layers and on the light absorption material.

Yet another objective of the invention is to provide a mirror device with anti-reflective coating layer. The mirror device of the invention is used for a liquid crystal on silicon and comprises: a plurality of mirror units. A gap is disposed between the adjacent mirror units. Each mirror unit has a mirror layer and an anti-reflective coating layer. The mirror layer is used to reflect the light, and the anti-reflective coating layer is formed on edges of the first surface of the mirror layer.

Yet still another objective of the invention is to provide a mirror device with anti-reflective coating layer. The mirror device of the invention is used for a liquid crystal on silicon and comprises: a plurality of mirror layers, a light absorption material, an isolation coating layer and an anti-reflective coating layer. The mirror layers are used to reflect the light, and there is a gap between the adjacent mirror layers. The light absorption material is filled into the gaps. The isolation coating layer is formed on edges of a first surface of the mirror layers and on the light absorption material. The anti-reflective coating layer is formed on the isolation coating layer.

The mirror device of the invention has the anti-reflective coating layer on the mirror layer, which can shield the bright band area caused by fringe effect, so as to minimize the bad influence of the fringe effect. The circuit layer at the same height as the mirror layer, due to the anti-reflective coating layer covered on the circuit layer, can decrease the influence of electromagnet interference. In manufacture, the method of the invention follows the semiconductor manufacturing process, and has high precision and simple process.

DETAILED DESCRIPTION OF THE INVENTION

Figure 1A:
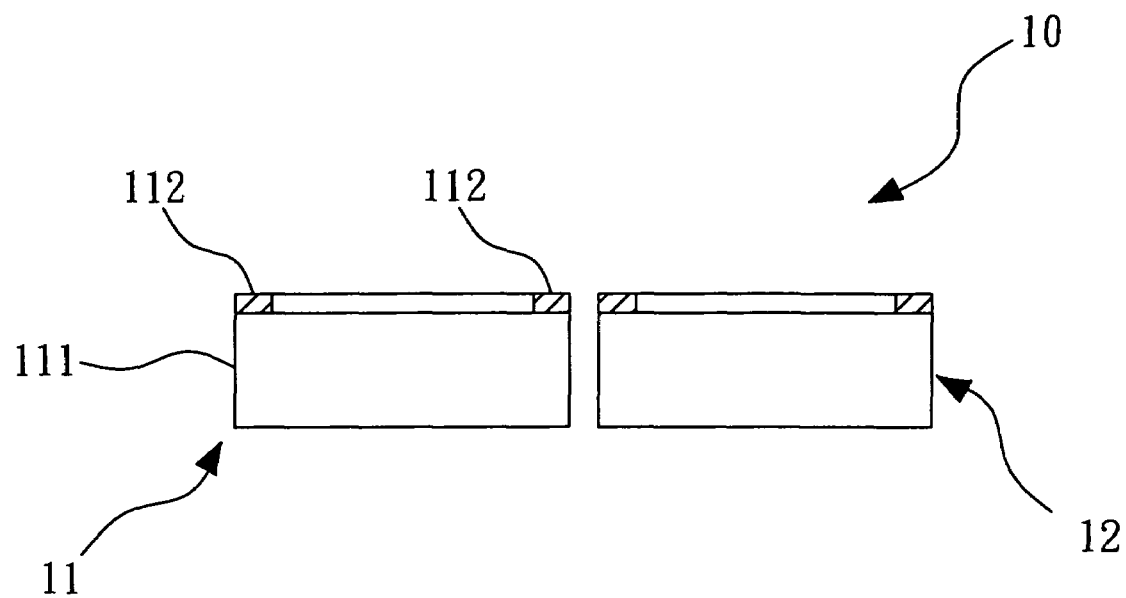
FIG. 1A is a cross-sectional schematic view of the mirror device of the invention.

Referring to the FIG. 1A, a cross-sectional schematic view of the mirror device of the invention is shown. The mirror device 10 of the invention is used for the liquid crystal on silicon (LCoS) and comprises: a plurality of mirror units 11 and 12. There is a gap between the mirror units 11 and 12. Each mirror unit has a mirror layer and an anti-reflective coating layer, wherein the mirror layer is used to reflect the light, and the anti-reflective coating layer is formed on edges of a first surface of the mirror layer. The mirror units take a pixel as a unit. Taking the mirror unit 11 as an example, the mirror unit 11 has a mirror layer 111 and an anti-reflective coating layer 112. The mirror layer 111 is used to reflect the light, and the anti-reflective coating layer 112 is formed on edges of a first surface of the mirror layer 11.

Figure 1B:
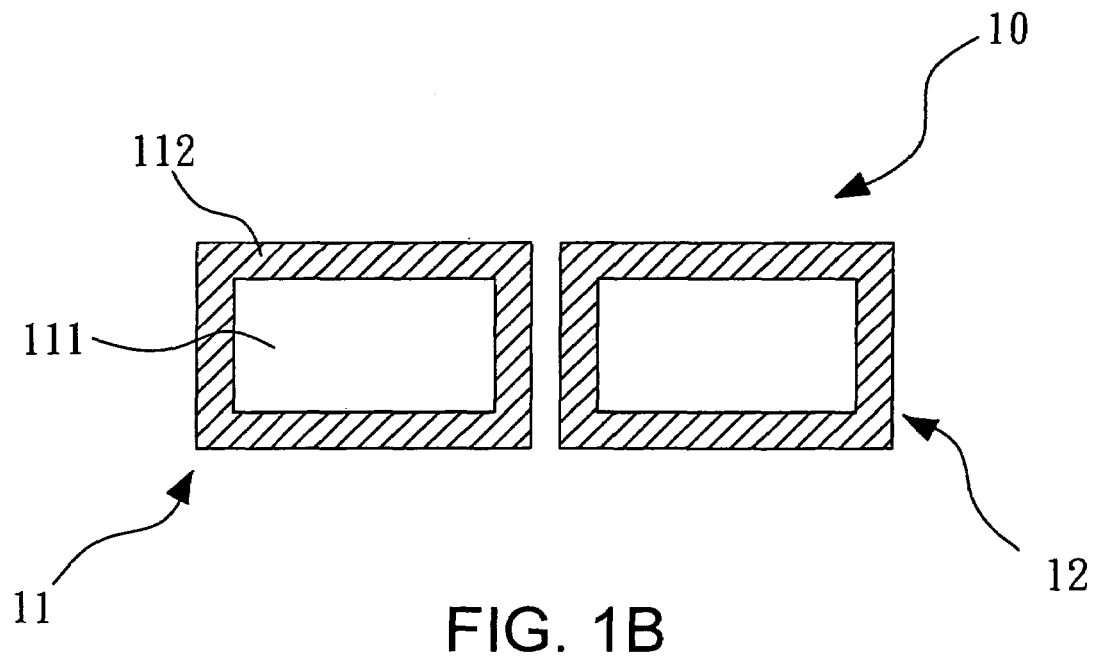
FIG. 1B is a top schematic view of the mirror device of the invention.

Referring to the FIG. 1B, a top schematic view of the mirror device 10 of the invention is shown. Preferably, the anti-reflective coating layer 112 is formed on edges of the first surface of the mirror layer 111 in a square cyclic shape. Thus, the anti-reflective coating layer of the invention can shield the bright band area caused by fringe effect, so as to minimize the bad influence of the fringe effect.

Referring to the FIGS. 2A-2D, schematic views of manufacture method of the mirror device with anti-reflective coating layer according to a first embodiment of the invention are shown. First referring to FIG. 2A, an anti-reflective metal film 21 is formed on a first surface of a mirror material 20 to be a mirror device 25. The mirror material 20 can be a metal material, and the anti-reflective metal film 21 can be an anti-reflective material, e.g., titanium nitride (TiN) etc. Referring to the FIG. 2B, a plurality of mirror units 26 and 27 are defined from the mirror device 25. Each mirror unit has a mirror layer and an anti-reflective metal film unit, the anti-reflective metal film unit is formed on a first surface of the mirror layer. Taking the mirror unit 26 as an example, the mirror unit 26 has a mirror layer 201 and an anti-reflective metal film unit 211. The anti-reflective metal film unit 211 is formed on a first surface of the mirror layer 201. The mirror units 26 and 27 are preferably formed by cutting the mirror device 25, so that each mirror unit has a gap.

Figure 2A:
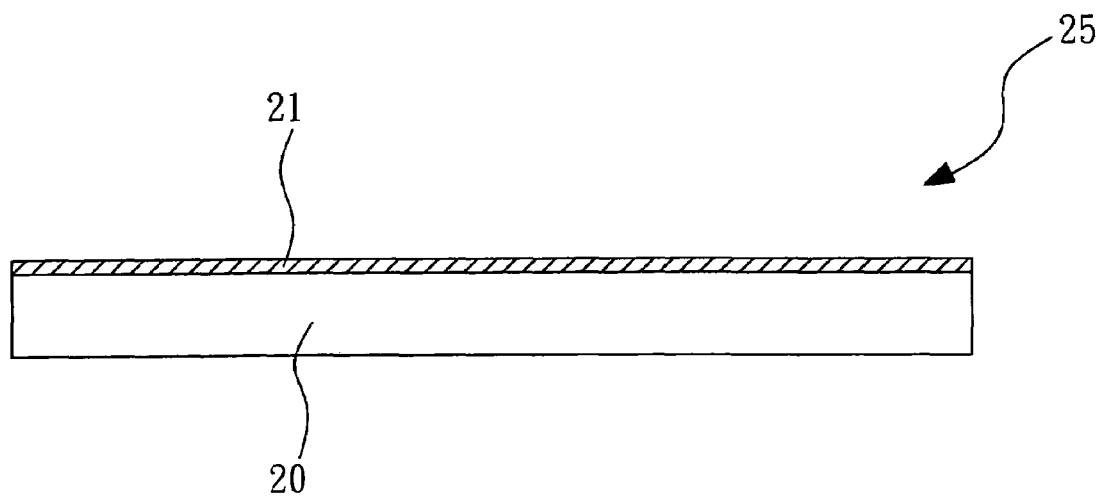
FIGS. 2A-2D are schematic views of the manufacture method of the mirror device according to a first embodiment of the invention.
Figure 2B:
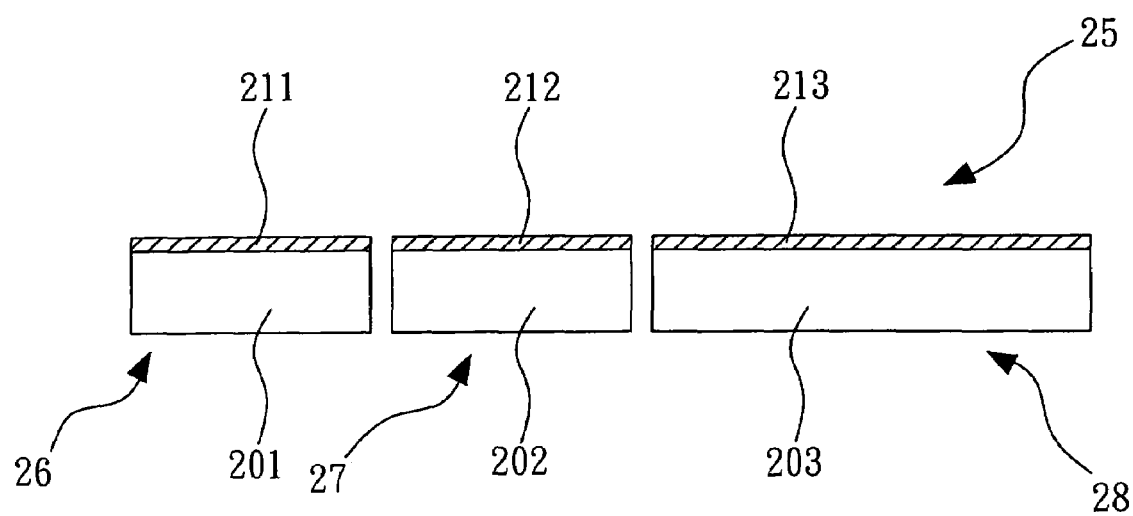
Figure 2C:
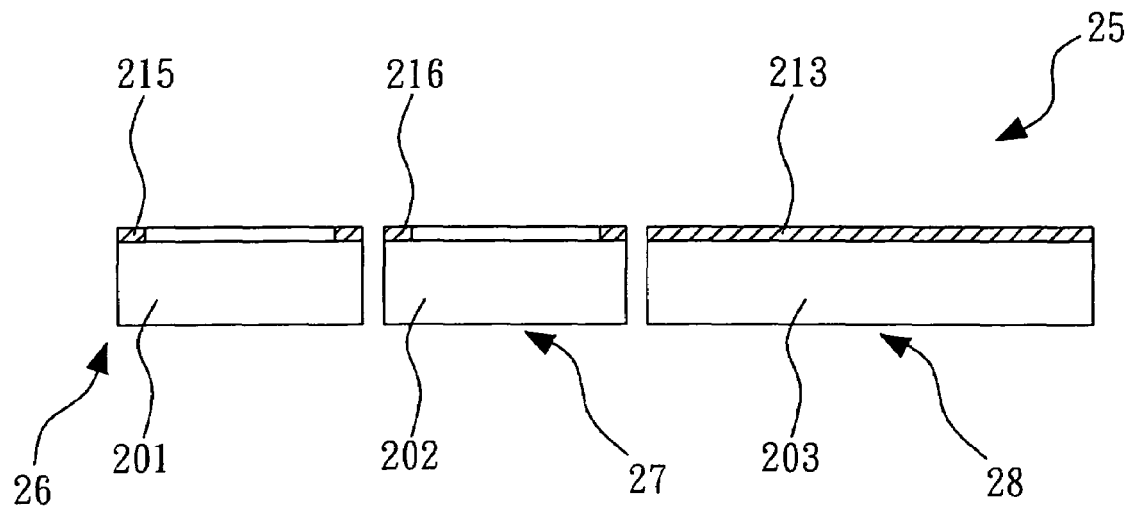

Referring to FIG. 2C, an anti-reflective coating layer 215 is defined from the anti-reflective metal film unit 211 (referring to FIG. 2B). The anti-reflective coating layer 215 is formed on edges of the first surface of the mirror layer 201. Preferably, the anti-reflective coating layer 215 is formed on edges of the first surface of the mirror layer 201 in a square cyclic shape. In addition, in this step, the central part may be removed from the anti-reflective metal film unit by etching method, so as to form the anti-reflective coating layer 215 in a square cyclic shape.

Figure 2D:
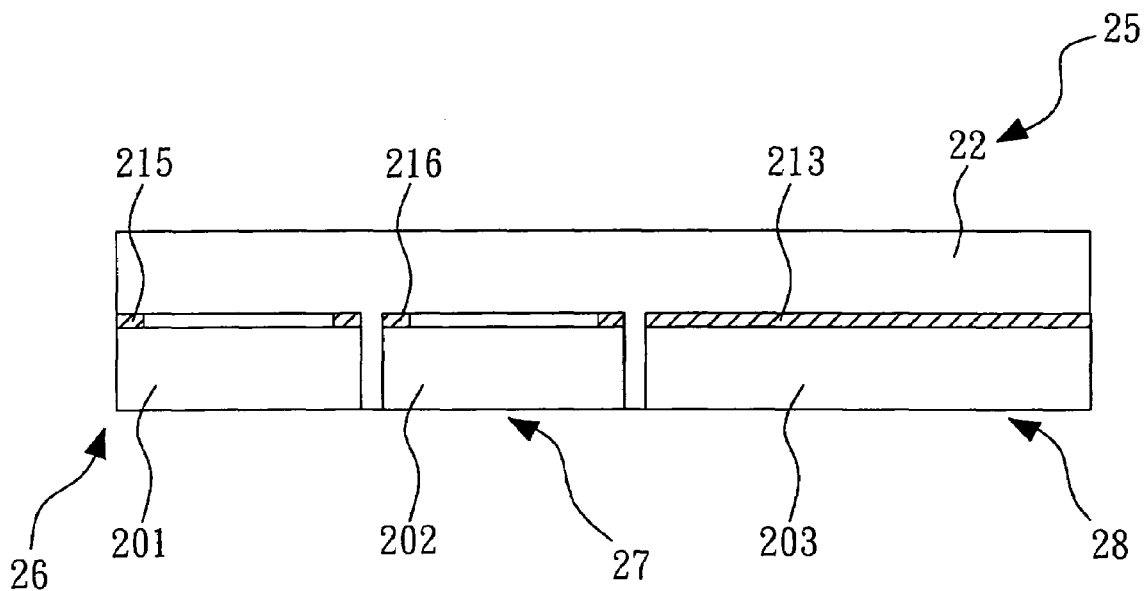

Referring to FIG. 2D, a passive layer 22 is formed. The passive lawyer 22 is filled into the gap between the mirror units 26 and 27, and formed on the first surface of the mirror units 26 and 27. Utilizing the above methods, a mirror device 25 with anti-reflective coating layer can be fabricated, so as to improve the bad influence of the fringe effect. In manufacture, the method of the invention follows the semiconductor manufacturing process, and has high precision and simple process.

Furthermore, referring to FIGS. 2B-2D again, a circuit unit 28, at the same height as the mirror units 26 and 27, has a circuit layer 203. An anti-reflective coating layer 213 can be formed onto the circuit layer 203 in the steps described above, so that the effect of electromagnet interference on the circuit layer 203 can be decreased.

The mirror device 25 can be fabricated by utilizing the manufacture method according to the first embodiment described above. The mirror device 25 comprises: a plurality of mirror unit 26 and 27. There is a gap between the mirror units 26 and 27. The mirror unit 26 has the mirror layer 201 and the anti-reflective coating layer 215; and the mirror unit 27 has the mirror layer 202 and the anti-reflective coating layer 216. In addition, the mirror device 25 further comprises the passive layer 22, which is filled between the mirror units 26 and 27, and formed on the first surface of the mirror units 26, 27.

Figure 3A:
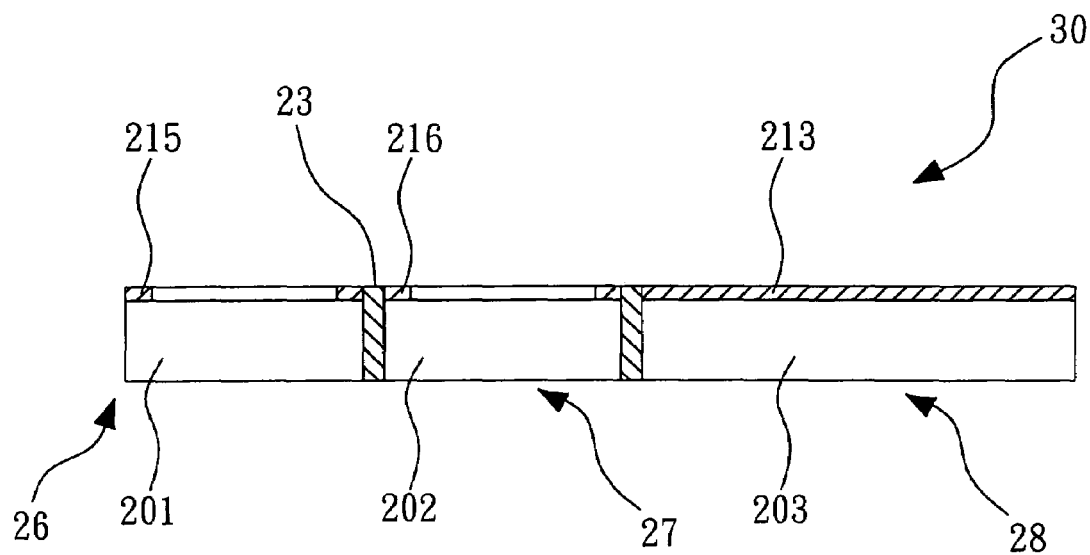
FIGS. 3A and 3B are schematic views of manufacture method of the mirror device according to a second embodiment of the invention.
Figure 3B:
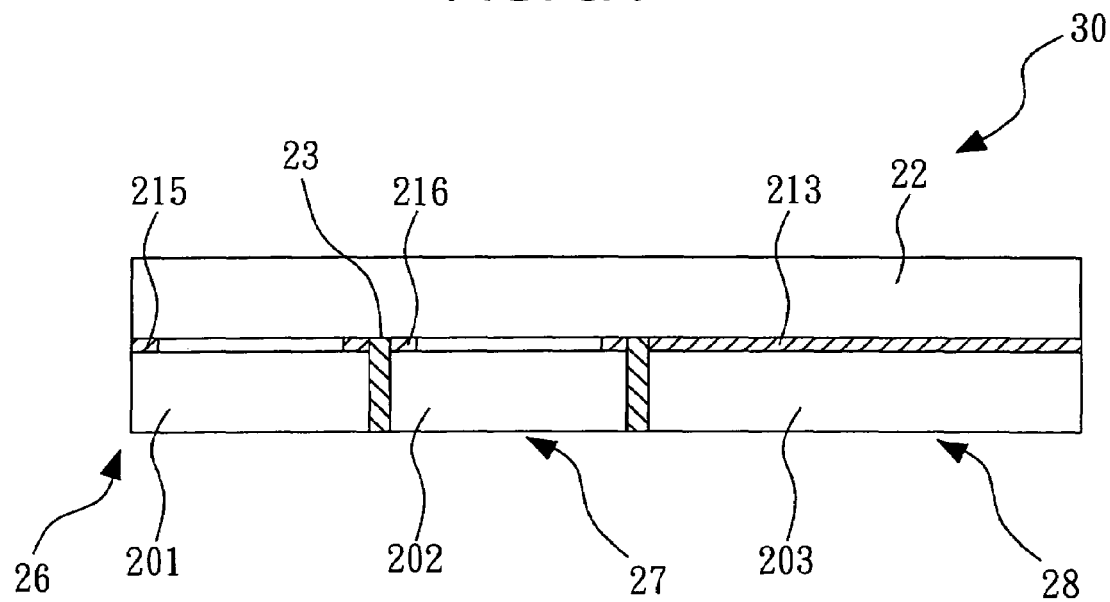

Referring to FIGS. 3A-3B, schematic views of manufacturing method of the mirror device with anti-reflective coating layer according to a second embodiment of the invention are shown. According to the second embodiment of the invention, the manufacturing method includes the abovementioned steps in FIGS. 2A-2C and FIGS. 3A and 3B. Illustrations of the steps in FIGS. 2A-2C can be referred to the manufacturing method according to the first embodiment above and will not be described any more herein. As shown in FIG. 3A, a light absorption material 23 is filled into the gap between the mirror units 26 and 27. The light absorption material 23 can be used to absorb the light. The light absorption material 23 is preferably filled to the same height as the anti-reflective coating layer 215. Referring to FIG. 3B, after the step of filling the light absorption material 23, a passive layer 22 can be further formed. The passive layer 22 is formed on the first surface of the mirror units 26 and 27, and cover the anti-reflective coating layer 215 and the light absorption material 23.

Utilizing the manufacturing method according to the second embodiment described above, the mirror device 30 can be fabricated. The mirror device 30 comprises: a plurality of mirror units 26 and 27. The mirror units 26 and 27 are the same as that of the first embodiment. The difference between the fist embodiment and the second embodiment is that the mirror device 30 has the light absorption material 23 filled into the gap between the mirror units 26 and 27. In addition, the mirror device 20 further comprises the passive layer 22, which is formed on the first surface of the mirror units 26 and 27, and covered on the anti-reflective coating layer 215 and the light absorption material 23.

Figure 4A:
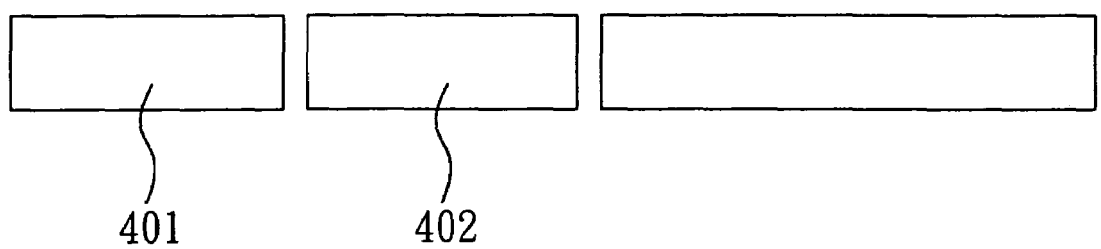
FIGS. 4A-4E are schematic views of manufacture method of the mirror device according to a third embodiment of the invention.
Figure 4B:
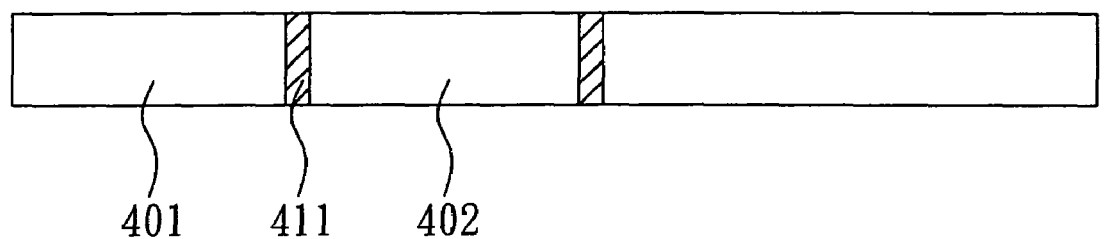
Figure 4C:
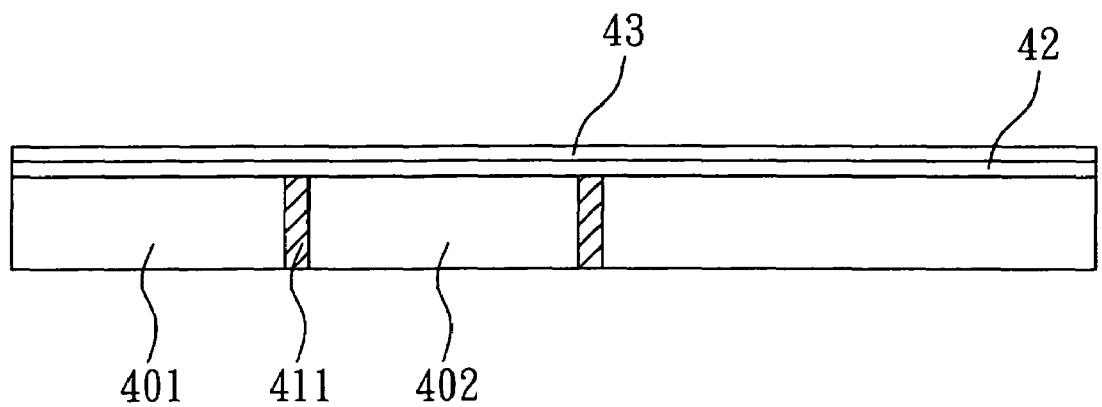

Referring to FIGS. 4A-4E, schematic views of manufacture method of the mirror device with anti-reflective coating layer according to a third embodiment of the invention. First referring to FIG. 4A, a plurality of mirror layers 401 and 402 is defined from a mirror material. There is a gap between the mirror layers 401 and 402. Preferably, the mirror material is cut to form the mirror layers 401 and 402. Referring to FIG. 4B, a light absorption material 411 is filled into the gap between the mirror layers 401 and 402. Referring to FIG. 4C, an isolation layer 42 is formed on a first surface of the mirror layers 401 and 402, and an anti-reflective metal film 43 is formed on a first surface of the isolation layer 42.

Figure 4D:
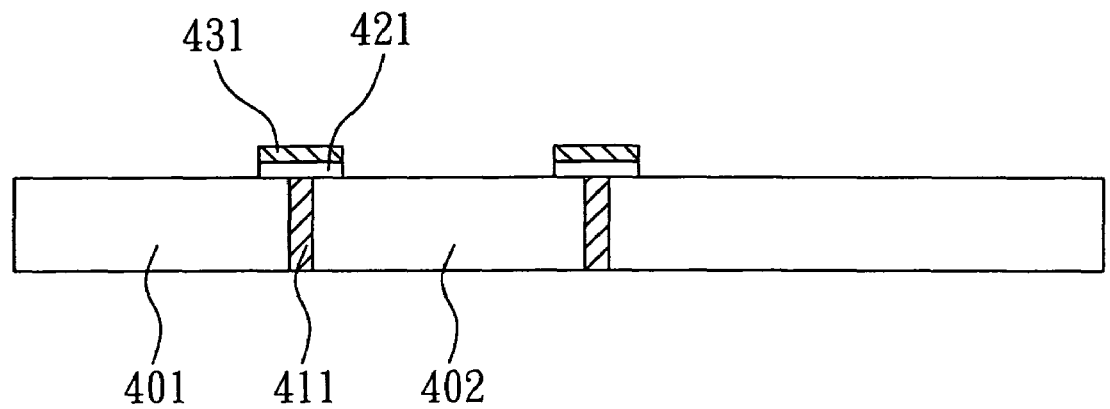
Figure 4E:
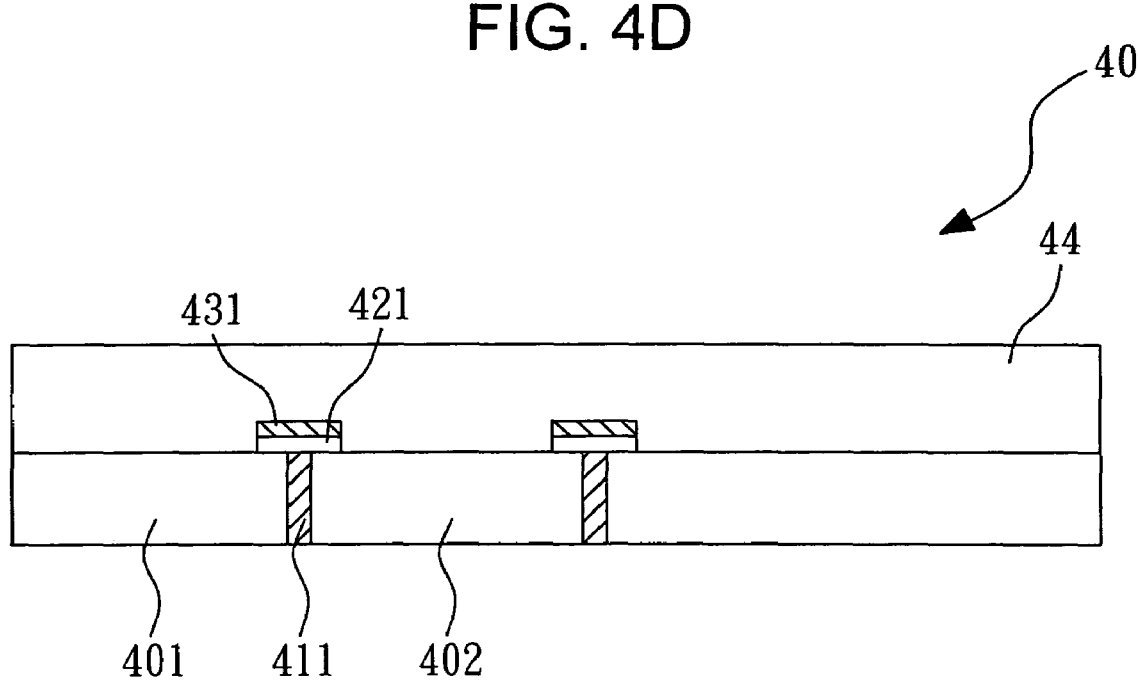
Figure 5:
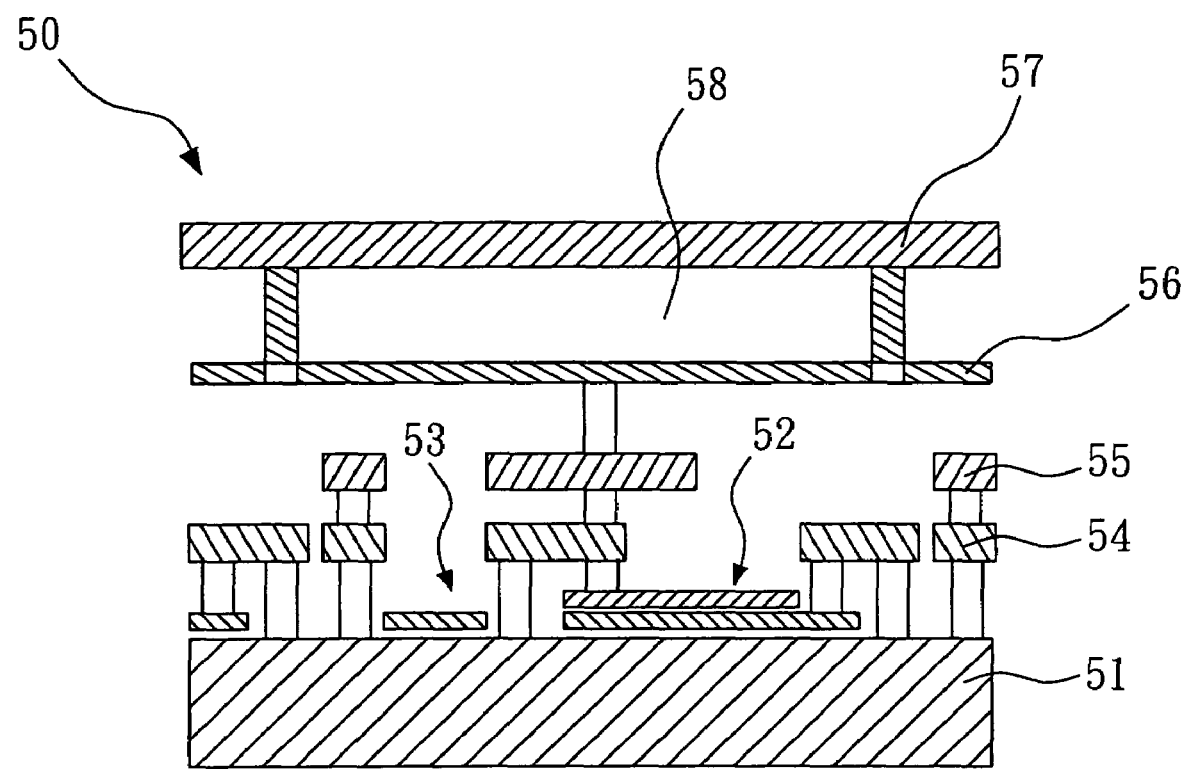
FIG. 5 is a structural schematic view of a conventional liquid crystal on silicon.

Referring to FIG. 4D, an isolation coating layer 421 and an anti-reflective coating layer 431 is defined from the isolation layer 42 and the anti-reflective metal film 43. The isolation coating layer 421 and the anti-reflective coating layer 431 are formed on edges of the first surface of the mirror layers 401 and 402 and on the light absorption material 411. That is, the isolation coating layer 421 and the anti-reflective coating layer 431 are formed on edges of the first surface of the two adjacent mirror layers 401 and 402 and on the light absorption material 411. In this step, part of the anti-reflective metal film 43 and the isolation layer 42 located on the central part of the first surface of the mirror layers 401 and 402 is removed by etching, so as to form the isolation coating layer 421 and the anti-reflective coating layer 431. Referring to FIG. 4E, a passive layer 44 is formed on the first surface of the mirror layers 401, 402, and covered on the anti-reflective coating layer 431.

Utilizing the manufacturing method according to the third embodiment described above, the mirror device 40 can be fabricated. The mirror device 40 comprises: a plurality of mirror layers 401 and 402, a light absorption material 411, an isolation coating layer 421 and an anti-reflective coating layer 431. The light absorption material 411 is filled into the gaps of the mirror layers 401 and 402. The isolation coating layer 421 is formed on edges of the first surface of the mirror layers 401 and 402 and on the light absorption material 411. The anti-reflective coating layer 431 is formed on the isolation coating layer 421. Since both the light absorption material 411 and the anti-reflective coating layer 431 are conductive materials, an isolation coating layer 421 is added therebetween for isolation. In addition, the mirror device 40 further comprises the passive layer 44, which is formed on the first surface of the mirror units 401, 402 and covered on the anti-reflective coating layer 431.

While several embodiments of the present invention have been illustrated and described, various modifications and improvements can be made by those skilled in the art. The embodiment of the present invention is therefore described in an illustrative, but not restrictive, sense. It is intended that the present invention may not be limited to the particular forms as illustrated, and that all modifications which maintain the spirit and scope of the present invention are within the scope as defined in the appended claims.

What is claimed is:

1. A method for manufacturing a mirror device with anti-reflective coating layer, comprising the steps of:
   (a) forming an anti-reflective metal film on a first surface of a mirror material to be a mirror device;
   (b) defining a plurality of mirror units from the mirror device, each mirror unit having a mirror layer and an anti-reflective metal film unit, the anti-reflective metal film unit formed on a first surface of the mirror layer; and
   (c) defining an anti-reflective coating layer from the anti-reflective metal film unit, the anti-reflective coating layer formed on edges of the first surface of the mirror layer,
   wherein in the step (c), a central part of the anti-reflective metal film is removed from the anti-reflective metal film unit so as to form the anti-reflective coating layer in a square cyclic shape.

2. The method as claimed in claim 1, after the step (c) further comprising a step for forming a passive layer, the passive layer filled between the mirror units and formed on the first surface of the mirror unit.

3. The method as claimed in claim 1, further comprising, after the step (c) further comprising a step for filling a light absorption material between the mirror units.

4. The method as claimed in claim 3, after filling the light absorption material, further comprising a step for forming a passive layer, the passive layer formed on the first surface of the mirror unit.

5. The method as claimed in claim 3, wherein the light absorption material is filled to the same height as the anti-reflective coating layer.

6. The method as claimed in claim 1, wherein the anti-reflective coating layer is formed on edges of the first surface of the mirror layer unit in a square cyclic shape.

7. The method as claimed in claim 1, wherein in the step (b), the mirror device is cut so as to form the mirror units.

8. A method for manufacturing a mirror device with anti-reflective coating layer, comprising the steps of:
   (a) defining a plurality of mirror layers from a mirror material, a gap disposed between the adjacent mirror layers;
   (b) filling a light absorption material into the gaps;
   (c) forming an isolation layer on a first surface of the mirror layers;
   (d) forming an anti-reflective metal film on a first surface of the isolation layer; and
   (e) defining an isolation coating layer and an anti-reflective coating layer from the isolation layer and the anti-reflective metal film respectively, the isolation coating layer and the anti-reflective coating layer formed on edges of the first surface of the mirror layers and on the light absorption material, wherein:
   in the step (e), a central part of the anti-reflective metal film and the isolation layer on the first surface of the mirror layers is removed so as to form the isolation coating layer and the anti-reflective coating layer; and the isolation coating layer and the anti-reflective layer are in a square cyclic shape.

9. The method as claimed in claim 8, after the step (e), further comprising a step for forming a passive layer, the passive layer formed on the first surface of the mirror layers and on the anti-reflective coating layer.

10. The method as claimed in claim 8, wherein in the step (b), the light absorption material is filled to the same height as the first surface of the mirror layers.

11. The method as claimed in claim 8, wherein the isolation coating layer and the anti-reflective coating layer are formed on edges of the first surface of the two adjacent mirror layers and on the light absorption material.

12. The method as claimed in claim 8, wherein in the step (a), the mirror material is cut so as to form the mirror layers.

13. A mirror device with anti-reflective coating layer, comprising:
   a plurality of mirror units, a gap disposed between the adjacent mirror units, each mirror unit having a mirror layer and an anti-reflective coating layer, the mirror layer used to reflect the light, the anti-reflective coating layer formed on edges of a first surface of the mirror layer,
   wherein the anti-reflective coating layer is formed on edges of the first surface of the mirror layer in a square cyclic shape.

14. The mirror device as claimed in claim 13, further comprising a passive layer, filled between the mirror units and formed on the first surface of the mirror unit.

15. The mirror device as claimed in claim 13, further comprising a light absorption material, filled into the gaps between the mirror units.

16. The mirror device as claimed in claim 15, wherein the light absorption material is filled to the same height as the anti-reflective coating layer.

17. The mirror device as claimed in claim 16, further comprising a passive layer, formed on the first surface of the mirror layer, on the anti-reflective coating layer and on the light absorption material.

18. A mirror device with anti-reflective coating layer, comprising:
   a plurality of mirror layers, for reflecting the light, a gap disposed between the adjacent mirror layers;
   a light absorption material, filled into the gaps;
   an isolation coating layer, formed on edges of a first surface of the mirror layers and on the light absorption material; and
   an anti-reflective coating layer, formed on the isolation coating layer,
   wherein the anti-reflective coating layer is formed on the edges of the first surface of the mirror layers in a square cyclic shape.

19. The mirror device as claimed in claim 18, further comprising a passive layer, formed on the first surface of the mirror layers and on the anti-reflective coating layer.

20. The mirror device as claimed in claim 18, wherein the light absorption material is filled to the same height as the first surface of the mirror layers.

21. The mirror device as claimed in claim 18, wherein the isolation coating layer and the anti-reflective coating layer are formed on edges of the first surface of the two adjacent mirror layers and on the light absorption material.

* * * * *